United States Patent
Cens et al.

(10) Patent No.: US 6,779,927 B2
(45) Date of Patent: Aug. 24, 2004

(54) FEEDTHROUGH WITH OPTIC FIBER SEALED IN PROTECTIVE TUBE AND OPTICAL MEASUREMENT APPARATUS USING THE SAME

(75) Inventors: Fabien Cens, Massy (FR); Fadhel Rezgui, Sceaux (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/380,882

(22) PCT Filed: Sep. 20, 2001

(86) PCT No.: PCT/EP01/10981

§ 371 (c)(1),
(2), (4) Date: Mar. 19, 2003

(87) PCT Pub. No.: WO02/25344

PCT Pub. Date: Mar. 28, 2002

(65) Prior Publication Data

US 2003/0180025 A1 Sep. 25, 2003

(30) Foreign Application Priority Data

Sep. 25, 2000 (FR) .......................................... 00 12250

(51) Int. Cl.$^7$ ............................................... G02B 6/36
(52) U.S. Cl. ............................................. 385/84; 385/80
(58) Field of Search ........................... 385/138, 80, 84, 385/102

(56) References Cited

U.S. PATENT DOCUMENTS

| | | | | |
|---|---|---|---|---|
| 4,119,363 A | * | 10/1978 | Camlibel et al. | 385/84 |
| 4,367,917 A | * | 1/1983 | Gray | 385/102 |
| 4,509,820 A | * | 4/1985 | Murata et al. | 385/99 |
| 4,984,865 A | * | 1/1991 | Lee et al. | 385/53 |
| 5,024,503 A | * | 6/1991 | Gunn et al. | 385/53 |
| 5,943,462 A | * | 8/1999 | Schofield et al. | 385/100 |
| 5,956,443 A | * | 9/1999 | Carberry et al. | 385/43 |
| 6,337,737 B1 | * | 1/2002 | Chang et al. | 356/32 |

* cited by examiner

*Primary Examiner*—Chandrika Prasad
(74) *Attorney, Agent, or Firm*—Victor H. Segura; Brigitte L. Echols; John Ryberg

(57) ABSTRACT

The invention relates to an optical feedthrough including an optical fiber (11) and a protective tube (10) surrounding said fiber. In the invention, a seal (6) extends inside the annular space between the protective tube and the optical fiber, the length of said seal being greater than 50 mm.

13 Claims, 1 Drawing Sheet

FIGURE
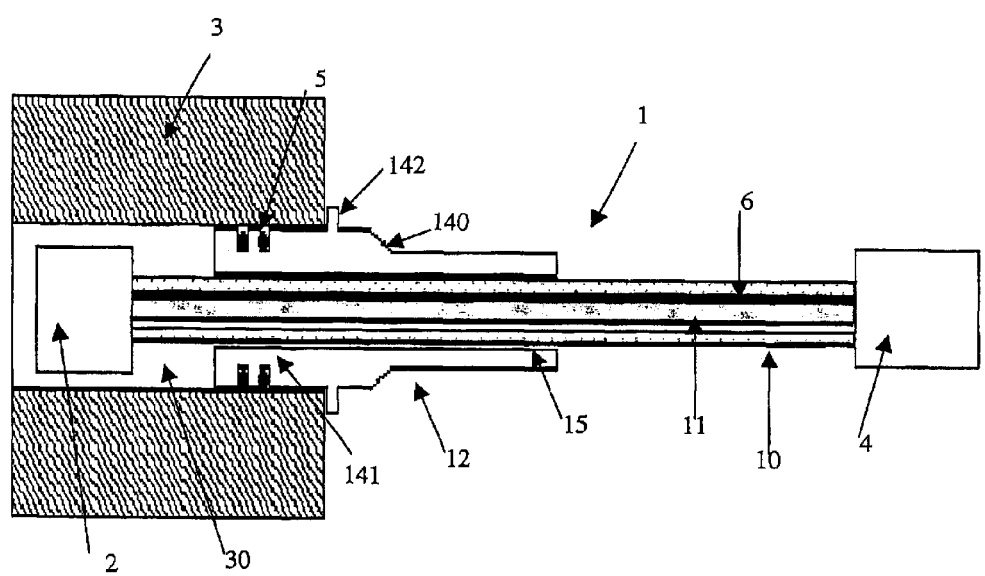

FEEDTHROUGH WITH OPTIC FIBER SEALED IN PROTECTIVE TUBE AND OPTICAL MEASUREMENT APPARATUS USING THE SAME

The invention relates the field of optical feedthroughs. It relates more particularly to optical feedthroughs designed to interconnect two elements situated in respective environments that are sealed relative to each other.

Very often, apparatus containing optical fibers has the particularity that, for the needs of taking measurements, the fibers are situated in a wet or corrosive environment in which the pressure and the temperature can be high, while it is essential for the electronic equipment to which they are connected to be situated in a dry and clean environment and preferably under pressure conditions that are close to atmospheric conditions. Generally, it is necessary not only to solve problems of protecting the fibers, in order to guarantee effective optical transmission, but above all to solve problems of sealing the coupling between the fibers and the electronic equipment which is often placed in a protective enclosure. Thus, it is necessary to ensure that strict separation exists between the polluting environment surrounding the fibers and the environment inside the protective enclosure, while also allowing the fibers to penetrated into the protected environment.

Document U.S. Pat. No. 5,943,462 proposes an optical feedthrough that aims to solve the problem of sealing between the electronic equipment, situated in a protective housing, and the polluting environment surrounding the optical fiber. To that end, that document describes a feedthrough made up of two main portions. A first portion, through which a channel passes that serves to pass the fiber into a protective housing, is screwed via one end to said housing while the other end is screwed to the second portion, in the manner of a stopper. When the two portions are screwed together, they flatten the elastomer seals serving to provide sealing. The fiber also passes through said second portion.

That solution is not really satisfactory. That feedthrough is firstly particularly complicated and requires a large number of parts: it is therefore difficult and costly to manufacture. Secondly, when the fiber is situated in surroundings that are particularly polluting and/or that are under high pressure, the coupling provided by compressing the elastomer seals is not reliable. Such an optical feedthrough cannot withstand being used at particularly high pressures such as those encountered in hydrocarbon wells.

Other coupling solutions that are simpler have been developed. In particular, direct coupling is known that is constituted by brazing between the fiber and the protective housing: the fiber passes through the wall of the housing via an orifice that is filled in with brazing. Those solutions are indeed very simple and inexpensive to perform, but their weakness lies in the difficulty of assembling together effectively materials as different as the silica of the fiber and the metal of the brazing. In addition, those solutions raise obvious maintenance problems. Since a brazed coupling cannot be disassembled, if any one of the elements of the feedthrough is damaged, the entire feedthrough must be replaced, which is impractical and above all costly.

An object of the invention is to remedy those drawbacks by providing an optical feedthrough which guarantees excellent sealing between the electronic equipment and the environment surrounding the fiber under all conditions, the feedthrough being particularly well-suited to withstanding high stresses, in particular due to the temperature, to the pressure, or to the aggressiveness of said environment.

To this end, the invention provides an optical feedthrough including an optical fiber and a protective tube surrounding said fiber. In the invention, a seal extends inside the annular space between the protective tube and the optical fiber, the length of said seal being greater than 50 mm.

In this way, the feedthrough of the invention provides effective protection for the fiber against a polluting outside environment, while also distributing the stresses exerted by this environment, in particular those due to pressure. Since the seal extends inside the annular space between the tube and the fiber over quite a long distance, the chances of a leakage path being created by the seal being distributed poorly in the annular space are minimized, where such a leakage path would make it possible, in the event of the feedthrough breaking, for polluting fluids to penetrate through said annular space. The optical feedthrough of the invention is thus particularly well-suited to operating conditions under which the environment surrounding the electronic measurement instruments is very different from the environment in which the measurements are taken.

In a preferred embodiment of the invention, the seal extends inside the annular space between the protective tube and the optical fiber, over the entire length of said protective tube.

This embodiment makes it possible to guarantee total leaktightness for the connections made by the optical feedthrough of the invention. It is highly unlikely that polluting fluids can penetrate over such a length via the annular space between the tube and the fiber to reach the sensitive means to which the fiber is connected. The longer the seal, the lower the chances of a path being created to said means by said seal being poorly distributed in the annular space. In addition, the presence of the seal over the entire length of the fiber makes it possible to impart greater strength to the feedthrough.

In an advantageous embodiment of the invention, the protective tube is made of metal.

This embodiment makes it possible firstly to stiffen the optical feedthrough as a whole, and thus to increase its resistance to shocks during handling. In addition, when the optical feedthroughs of the invention are used in wells containing hydrocarbons or water, the protective tube is particularly effective in these highly abrasive and corrosive environments for avoiding any breaking of the optical fiber. Furthermore, since the protective housings surrounding the electronic means connected to the fiber are very often made of metal, it is easy and inexpensive to provide reliable coupling between the tube and the housings if they are made of the same material.

In a preferred embodiment of the invention, the diameter of the fiber is close to the inside diameter of the protective tube, so that the thickness of the seal is preferably less than 0.05 mm.

It is preferable for the thickness of the annular space to be limited so as to guarantee that the fiber is placed ideally inside the protective tube. To reduce the probability of having a seal-free path through the annular space, it is necessary to ensure that the fiber occupies as much space as possible inside the tube, and thus for the seal also to be distributed uniformly over the small available space, without an undesirable build-up in one place to the detriment of some other place, because of the space left unoccupied by the fiber.

In a preferred embodiment of the invention, the seal is a seal of thermo-settable adhesive, said seal being polymerized in the protective tube at a first temperature so that, at a second temperature that is lower than said first temperature, said seal is compressed between the walls of said tube and the optical fiber.

In this way, since the seal is polymerized inside the annular space at the maximum temperature at which the feedthrough is to be used, then, at the time it is polymerized, said seal occupies all of the available space in said annular space with the expansion of the protective tube being at its maximum. In which case, the seal is compressed against the walls of the tube while the feedthrough is being used over an entire range of temperatures extending to the maximum temperature (the polymerization temperature). It is thus possible to limit the risks of the seal breaking, and particularly the risks of cracks forming in it, while maximizing the sealing of the annular space when the tube and the fiber are in the aggressive environment.

This embodiment also makes it possible to accommodate as well as possible the differences in materials, and thus the differences in thermal expansion between the optical fiber and the protective tube. The optical fiber is made of silica whereas the tube is made of a completely different material, e.g. a metal. In which case, when the environment surrounding the feedthrough is at high temperatures or at high pressures, the tube tends to expand to a greater extent than the extent to which the fiber expands. If the seal were not under compression, but rather at its maximum expansion, it would not be able to withstand such differential expansion, and it would break. Whereas, in this embodiment, the seal expands naturally inside the annular space so that, without breaking, it compensates for the differential expansion between the tube and the fiber. The leaktightness of the annular space is thus guaranteed even when the feedthrough is highly stressed, in particular due to temperature or pressure.

In another preferred embodiment of the invention, the seal extends inside the annular space between the optical fiber and the protective tube, at least from a first end of said fiber to a preferred zone of weakness of said protective tube.

This solution makes it possible to control the place at which any breaking takes place, and consequently to provide enough material to guarantee sealing when the fiber is connected to electronic measurement means. In which case, it is necessary merely for the seal to extend at least as far as said preferred zone of weakness.

In an advantageous embodiment of the invention, the second end of the fiber is connected to an element situated outside a housing, said feedthrough including closure means co-operating with the protective tube so as to seal off the inside of said housing relative to the outside environment. In this feedthrough, the first end of the fiber is situated inside the housing, and the preferred zone of weakness is situated outside said housing.

The characteristics of the optical feedthrough of the invention make it possible to provide effective sealing between an environment situated inside a protective housing, containing electronic means for example, and the outside of the housing, where conditions are such that they would damage said electronic means. By placing the preferred zone of weakness outside the housing, and by ensuring that the seal extends from the inside of the housing to said zone of weakness, the chances of elements penetrating into the housing in the event that the feedthrough breaks are lowered considerably.

In an embodiment of the invention, the closure means include a sleeve through which the protective tube passes.

This embodiment enables sealing relative to the outside environment to be provided easily and reliably where the protective tube containing the fiber passes into the housing.

The sleeve makes it possible to increase the stiffness of the assembly in the vicinity of this critical zone. In addition, the use of the sleeve makes it possible to disassemble the optical feedthrough of the invention. This makes it easy to change the feedthrough in the event that it is damaged, and thus facilitates maintenance of the tool that it equips.

In a preferred embodiment of the invention, a first end of the sleeve is situated outside the housing and is coupled to the protective tube so that the coupling corresponds to the preferred zone of weakness of said tube.

This configuration makes it possible to control the place at which any breaking of the optical feedthrough takes place, and consequently to control the constraints for sealing the feedthrough. In addition, since the zone of weakness is offset relative to the sealing zone (the other end of the sleeve), a "safety" length is retained that corresponds to the length of the feedthrough, in order to preserve the leaktightness of the zone in which the protective tube and the fiber penetrate into the housing.

In another advantageous embodiment of the invention, the sleeve is made of metal, and it is connected by brazing to the protective tube which is also made of metal.

In this way, the sleeve imparts additional stiffness to the coupling to the housing. Since the housing is very often made of metal, it is easy to couple together the elements, the solution of brazing being particularly inexpensive.

Other advantages and characteristics of the invention appear more clearly from the following description given with reference to the sole accompanying drawing which is a longitudinal section view of an embodiment of an optical feedthrough of the invention.

The figure shows an optical feedthrough 1 serving to connect a first element 2 situated inside a housing 3 to a second element 4 situated outside said housing. In this embodiment, the element 2 is constituted by electrical equipment for recording and analyzing data collected by the element 4 which is an optical sensor, the optical feedthrough 1 causing said data to flow between the sensor 4 and the equipment 2.

The optical feedthrough 1 is made up of a protective tube 10 surrounding an optical fiber 11, the resulting assembly passing from the outside environment to the inside of the housing 3 via a hollow cylindrical sleeve 12. The tube 10 protects the fiber 11 from the outside environment which may contain polluting and corrosive liquids. As shown in the figure, the tube 10 covers the fiber over its entire length from the inside of the housing to the element 4. The tube thus makes it possible to guarantee maximum effectiveness for the fiber 11, while imparting strength to the assembly.

A first end 14 of the sleeve 12 is made up of two portions 140 and 141. The first portion 140, situated outside the housing 3, abuts against the housing via a collar 142 which acts as a positioning abutment on mounting the feedthrough on the housing. The portion 141 behind the collar 142 is plugged into a sleeve-receiving channel 30 in the housing 3. This portion is provided with annular grooves receiving O-ring seals 5 that act to provide a sealing barrier relative to the outside environment (more precisely, the second O-ring seal acts as a "backup" in case the first seal is damaged). The hollow sleeve 12 is provided with a through bore opening out inside the housing 3. The assembly comprising the protective tube 10 and the optical fiber 11 passes through this bore from the outside environment to the inside of the housing, where it connects to the element 2.

The second end 15 of the sleeve 12 is rigidly coupled to the protective tube 10. In one embodiment, both the sleeve 12 and the tube 10 are made of metal, and the coupling is performed merely by brazing. This fixed and rigid coupling constitutes a preferred zone of weakness of the feedthrough 1. When the feedthrough is placed in an aggressive environment or when it is subjected to high pressures, it is this weakened zone that bears the highest stresses and that thus runs the highest risk of yielding. In this way, the place at which any breaking of the feedthrough occurs is controlled.

Making the sleeve and the tube of metal is advantageous not only because the assembly is then less costly, but also because it is then possible to interconnect the two elements rigidly and effectively by simple means such as brazing, as indicated above, or by any other rigid coupling means. It is also advantageous to provide the preferred zone of weakness some distance away from the place at which sealing is provided relative to the housing 3. If the feedthrough breaks, the sleeve 12 and the remaining portions of the protective tube 10 and of the fiber 11 remain in place in the housing 3 and maintain the sealing relative to the outside environment. Even if the feedthrough breaks, there is thus no danger of the element 2 being damaged.

As shown in the figure, a seal 6 fills the annular space between the protective tube 10 and the optical fiber 11 over the entire length of the assembly. In this way, the seal prevents any polluting fluids from passing from the outside environment to the inside of the housing 3 via the annular space between the fiber and the tube. In a preferred embodiment of the feedthrough of the invention, this seal 6 is a seal of thermo-settable adhesive. This embodiment offers many advantages insofar as the coefficient of expansion and the Young's modulus of the optical fiber, which is made of silica, are very different from those of the protective tube, which is preferably made of metal. When the optical feedthrough is used in a high-temperature environment, the tube and the fiber expand to very different extents. Similarly, under high pressures, the tube is compressed differently to the optical fiber. It is thus necessary to find a seal that can "absorb" the differential expansion or compression without breaking. For this purpose, the seal 6 is thus a seal of adhesive that can be polymerized at the maximum temperature at which the optical feedthrough is used.

The seal 6 is then placed as follows.

The protective tube is filled with the chosen thermo-settable adhesive. The optical fiber 11 is inserted into the tube as filled with adhesive, the insertion being performed such that the risk of generating air bubbles in the tube and thus of generating places not filled with adhesive is as low as possible. The adhesive then becomes distributed throughout the annular space between the fiber and the tube. The assembly is then placed in an oven at the maximum temperature at which the optical feedthrough is to be used. Under the effect of the heat, the tube expands immediately while the fiber expands less, and the thickness of the annular space is then at its maximum. The adhesive is thus polymerized in this maximum space. Subsequently, when the assembly is removed from the oven, the protective tube shrinks and compresses the polymerized adhesive. In this way, when the feedthrough is used in a range of temperatures of up to the polymerization temperature, the still-compressed seal of adhesive naturally tends to occupy the entire annular space, thereby absorbing the differential expansion between the optical fiber and the tube. This technique is particularly advantageous because it makes it possible to use a seal between two very different materials, subjected to variations in temperature and thus to variations in geometrical shape, without ever weakening the sealing provided by the seal. In addition, at temperatures ranging up to the polymerization temperature, the seal is compressed against the walls of the tube. By avoiding the risks of cracks forming or of leakage paths being created, this increases the strength of the seal over time.

It is important to note that the diameter of the fiber and the inside diameter of the protective tube are advantageously close to each other, so that the thickness of the seal of adhesive is minimized. Above all, the fiber must be positioned uniformly inside the tube if the space allotted to the fiber is very large, said fiber can stick against one of the walls of the tube, in which case the adhesive does not reach that place. Ideally, the fiber should be centered in the middle of the tube so that the seal of adhesive is distributed uniformly inside the annular space, and so that there is almost no place without adhesive. The purpose of this is to prevent "adhesive-free paths" form forming in the tube that could channel external fluids into the housing if the feedthrough breaks. In order for the fiber to become substantially centered, the space available to it inside the tube must be minimized. Preferably, the thickness of the seal of adhesive is less than 0.05 mm.

As shown in the figure, if the feedthrough breaks in the zone of weakness, the entire length of seal between the second end 15 of the feedthrough and the inside of the housing prevents any ingress of fluids.

It can thus be understood that it is the length of the seal in the annular space between the fiber and the protective tube that is essential: the longer this length, the lower the risk of a preferred path through the adhesive leading to the inside of the housing. Even if the feedthrough breaks beyond the zone of weakness, sealing is still guaranteed because the seal of adhesive extends over a sufficient length. The length of the seal that is sufficient is 50 mm. Good results have been obtained for a length lying in the range 50 mm to 500 mm. Preferably said length is 300 mm. Beyond a certain length, although sealing is naturally guaranteed, problems can arise related to the lack of compactness of the feedthrough.

The preferred zone of weakness as shown in the figure is merely an embodiment of the invention. Provided that the length of the seal in the annular space between the fiber and the metal tube is sufficient to remove any risk of a preferred path running along the entire feedthrough to the inside of the housing or to the inside of the electronic equipment to which the feedthrough is connected, the optical feedthrough achieves the objectives of the invention.

In another embodiment, it is possible to make provision for the seal of adhesive to extend to the second end 15 of the sleeve 12 only, i.e. to the preferred zone of weakness. Furthermore, the sleeve 12 may be replaced by a mere stopper. These solutions can be disassembled and are very advantageous because, when the feedthrough is damaged, it is simple and quick to separate the assembly from the housing in order to install a new optical feedthrough. Maintenance of the assembly is made considerably easier.

In other embodiments, it is possible to use any seal other than a seal of thermo-settable adhesive, provided that said seal is capable of "absorbing" the differences in compression and/or in expansion between the fiber and the protective tube, and provided that it is relatively easy to insert into the annular space between the fiber and the tube. For example, the seal may be in the form of a powder. It would therefore be easy to distribute throughout the annular space, and the powder could then be polymerized by heating the assembly.

It is also possible to use any means other than a rigid coupling on the protective tube to organize the preferred zone of weakness in some other manner, such as a groove in the tube, a smaller-diameter portion, etc.

In other embodiments, a plurality of optical fibers are contained in the protective tube, with a seal being distributed between them. For the same reasons as above, it is preferable for the fibers to have as little space as possible in the tube so as to maximize the chances of the seal being distributed uniformly throughout the available space. In general, this is easy to achieve if the tube contains an odd number of optical fibers. It is also possible to twist the fibers together before they are inserted into the protective tube.

The optical feedthrough of the invention has many possible uses in the field of optical measurement, particularly when the measurement sensor is situated in an aggressive environment, at high temperatures and/or under high pressures, and when the associated electronic equipment is situated in a protective housing. An example of a preferred use of the invention relates to taking optical measurements down a well containing hydrocarbons, water, gas, or the like: in a hydrocarbon well, it is possible, for example, to use the optical feedthrough of the invention in apparatus for performing optical measurements to discriminate between the three phases of a three-phase effluent on the basis of the difference in the refractive indices of the phases. Downhole conditions are so difficult (high temperature, high pressure, and corrosive and abrasive liquids, etc.) that considerable precautions must be taken to protect the optical fiber and to connect the sensor to the electronic equipment protected inside a tool. The optical feedthrough of the invention is then particularly well suited to these situations.

What is claimed is:

1. An optical feedthrough including an optical fiber having a first end inside a housing, exposed to first conditions of pressure and a second end connected to an element outside said housing, exposed to second conditions of pressure, said feedthrough further including a protective tube surrounding the fiber and defining an annular space between the protective tube and the optical fiber, whereby a seal having a length greater than 50 mm is provided inside said annular space.

2. The optical feedthrough of claim 1, wherein the seal extends inside the annular space between the protective tube and the optical fiber, over the entire length of said protective tube.

3. The optical feedthrough of claim 1, wherein the protective tube is made of metal.

4. The optical feedthrough of claim 1, wherein the diameter of the fiber is close to the inside diameter of the protective tube, so that the thickness of the seal is less than 0.05 mm.

5. The optical feedthrough of claim 2, wherein the diameter of the fiber is close to the inside diameter of the protective tube, so that the thickness of the seal is less than 0.05 mm.

6. The optical feedthrough of claim 1, wherein the seal comprises a seal of adhesive, said seal being polymerized in the protective tube at a first temperature so that, at a second temperature that is lower than said first temperature, said seal is compressed between the walls of said tube and the optical fiber.

7. The optical feedthrough of claim 2, wherein the seal comprises a seal of adhesive, said seal being polymerized in the protective tube at a first temperature so that, at a second temperature that is lower then said first temperature, said seal is compressed between the walls of said tube and the optical fiber.

8. The optical feedthrough of claim 1, wherein the seal at least extends from the first end of said fiber to a preferred zone of weakness of said protective tube.

9. The optical feedthrough of claim 8, further including closure means co-operating with the protective tube so as to seal off the inside of said housing relative to the outside environment, and the preferred zone of weakness is situated outside said housing.

10. The optical feedthrough of claim 9, wherein the closure means include a sleeve through which the protective tube passes.

11. The optical feedthrough of claim 10, wherein a first end of the sleeve is situated outside the housing and is coupled to the protective tube so that the coupling corresponds to the preferred zone of weakness of said tube.

12. The optical feedthrough of claim 11, wherein the protective tube and the sleeve are made of metal, and the sleeve is connected by brazing to the protective tube.

13. An optical measurement apparatus to be used in a well containing hydrocarbons, gas, water or the like, which apparatus includes:

electronic measurement means situated inside a protective housing exposed to a first pressure;

an optical measurement sensor exposed to a second pressure; and an optical feedthrough connecting said optical measurement sensor to said electronic measurement means;

wherein said optical feedthrough comprises an optical fiber and a protective tube surrounding said fiber, and a seal extending inside the annular apace between said protective tube and said optical fiber, the length of said seal being greater than 50 mm.

* * * * *